Sept. 11, 1928.  W. G. SIMPSON  1,683,994
HYDROCARBON TURBINE ENGINE
Filed Nov. 8, 1924  2 Sheets-Sheet 1

Inventor
WILLIAM G. SIMPSON
By
Attorney

Sept. 11, 1928.  W. G. SIMPSON  1,683,994
HYDROCARBON TURBINE ENGINE
Filed Nov. 8, 1924  2 Sheets-Sheet 2
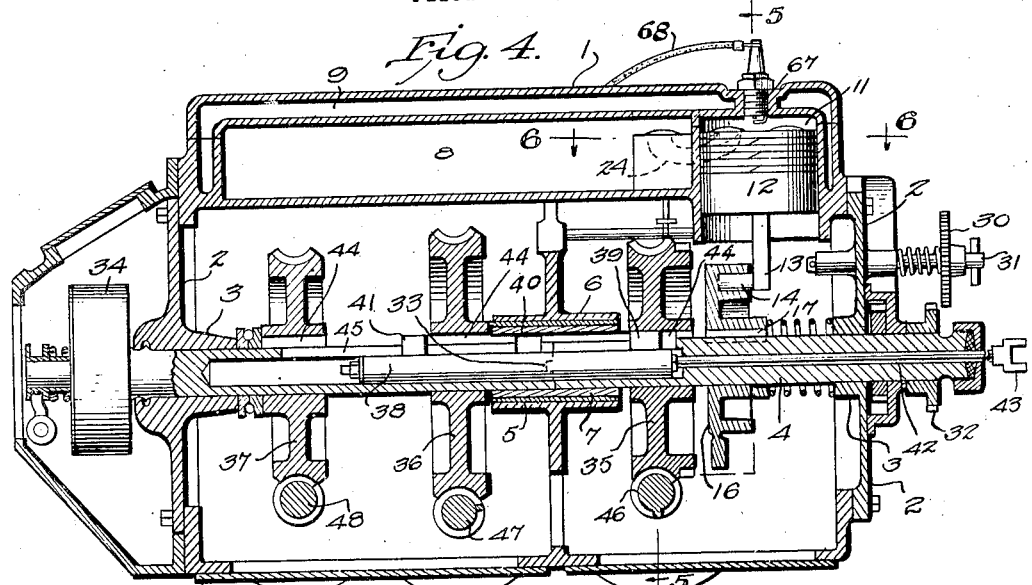
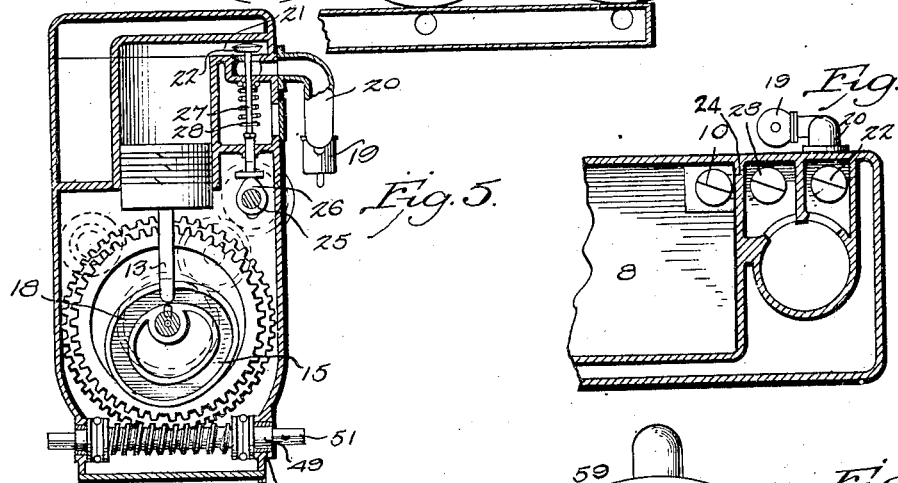
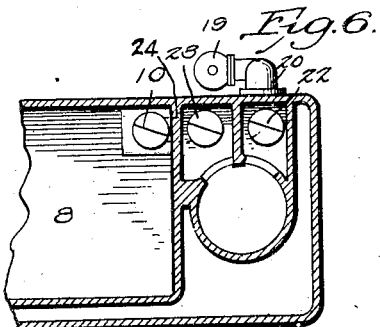
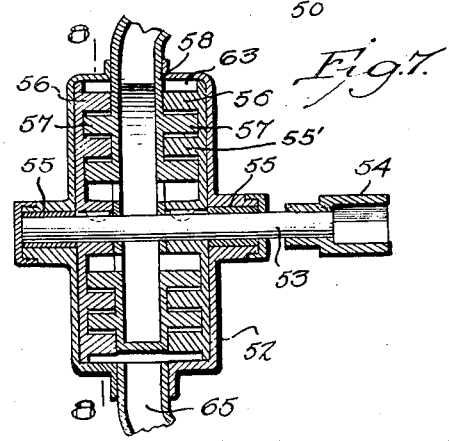
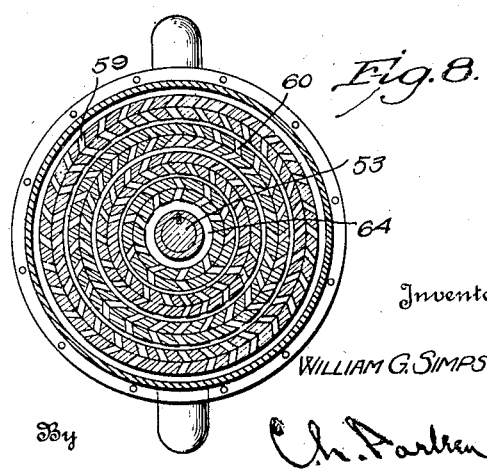
Inventor
WILLIAM G. SIMPSON
By
Attorney Patented Sept. 11, 1928.

1,683,994

UNITED STATES PATENT OFFICE.

WILLIAM G. SIMPSON, OF FERNDALE, MICHIGAN.

HYDROCARBON TURBINE ENGINE.

Application filed November 8, 1924. Serial No. 748,740.

This invention relates to engines, and more particularly to hydrocarbon turbine engines.

An object of the invention is to provide an engine in which the kinetic energy of gas under pressure is utilized at high velocity in a series of turbines for the purpose of propelling a vehicle or the like.

In the accompanying drawings, I have shown one embodiment of the invention. In this showing:

Figure 4 is a central vertical longitudinal sectional view,

Figure 5 is a vertical sectional view on line 5—5 of Figure 4,

Figure 6 is a horizontal sectional view on line 6—6 of Figure 4,

Figure 7 is a vertical sectional view of one of the turbines, and,

Figure 8 is a vertical sectional view of the reverse turbine on line 8—8 of Figure 7.

Figure 1:
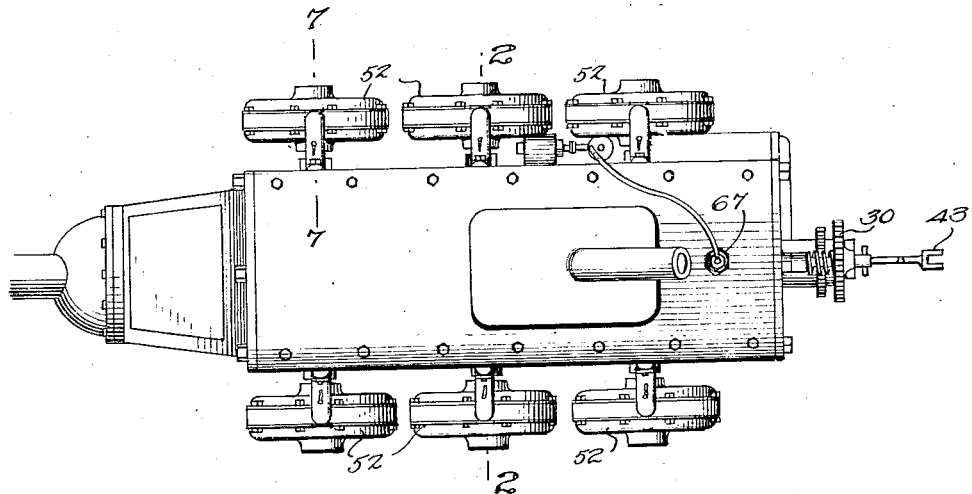
Figure 1 is a plan view.
Figure 3:
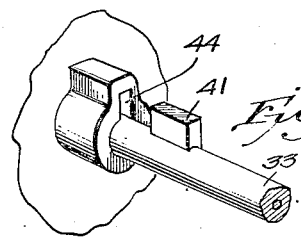
Figure 3 is a perspective view of a portion of the gear shifting mechanism.

Referring to the drawings, the reference numeral 1 designates generally the engine casing. A bearing plate 2 is arranged at each end of the engine casing and is provided with main bearings 3 for the reception of the main shaft 4. Centrally of the casing, I provide a stationary bushing 5 supported in a bearing 6 and adapted to receive a revolving bushing 7 carried by the main shaft. Within the casing, I provide a storage or equalizing chamber 8, separated from the top of the casing by a water jacket 9 and this casing is provided with an inlet opening closed by a valve 10. A cylinder 11 is arranged adjacent the chamber and a piston 12 is mounted in this cylinder. The piston is provided with a piston rod 13 having a roller 14 on its lower end adapted to be received in a groove 15 of a cam 16 which is keyed to the main shaft, as at 17. As shown, the cam is provided with a concentric portion 18. The cylinder is connected to a carburetor 19 through a manifold 20 and is provided with an inlet port 21 having a valve 22 arranged therein. The cylinder is further provided with an outlet opening normally closed by a valve 23 and communicating with a port or passage 24 extending to the inlet opening of the chamber 8. The valves are adapted to be actuated by cams in the usual manner. As shown, a cam shaft 25 is arranged beneath the valves and is provided with a plurality of cams 26 adapted to raise the valve stems 27 to open the valves against the tension of springs 28. The cam shaft is driven from the main shaft by suitable gearing 29, shown in dotted lines in Figure 5 of the drawings.

The engine is provided with a hand starter gear 30 mounted on a suitable shaft 31 supported in the front plate 2 of the engine and adapted to mesh with a spur gear 32 carried by the main shaft. The main shaft is formed in two sections and these two sections are adapted to be connected by a tongue on one section adapted to be received in a groove in the other section, as shown at 33 in Figure 4 of the drawings. The rear section extends through the rear end plate 2 and is adapted to receive the usual clutch 34. The main shaft is further provided with worm wheels 35, 36 and 37 adapted to be driven by the high speed, low speed, and reverse turbines, respectively. These gears are connected to the main shaft by means of keys which may be disconnected when desired. As shown, a portion of the main shaft is hollow and is adapted to receive a selector pilot 38 having a plurality of selector pilot keys 39, 40 and 41, respectively. The pilot is connected to a gear selector rod 42 which extends through the shaft and is provided with a clevis 43 on its outer end. The keys are adapted to be received in grooves 44 on the worm wheels and project through a slot 45 in the main shaft.

The worm wheels 35, 36 and 37 mesh with worms 46, 47, and 48 respectively, carried by shafts 49 which are mounted in suitable bearings 50 in the side walls of the engine casing and are provided with squared portions 51 projecting therefrom (see Figure 5). Adjacent each of the projecting portions of the shafts 49, I provide a turbine casing 52 having a shaft 53 arranged therein and the shaft is provided with a squared socket 54 on one end adapted to receive a squared end 51 of the worm shaft. As shown, the shaft 53 is mounted in suitable bearings 55 in the walls of the turbine. The turbine is provided with a rotor consisting of disks 55' having a plurality of concentric rings 56 on their adjacent faces. A series of similar rings 57 are received between the rings 56, and these rings are carried by a stator 58. The rings 56 are provided with ports or passages 59 which are substantially V- shaped and the rings 57 are provided with similar ports or passages 60.

Figure 2:
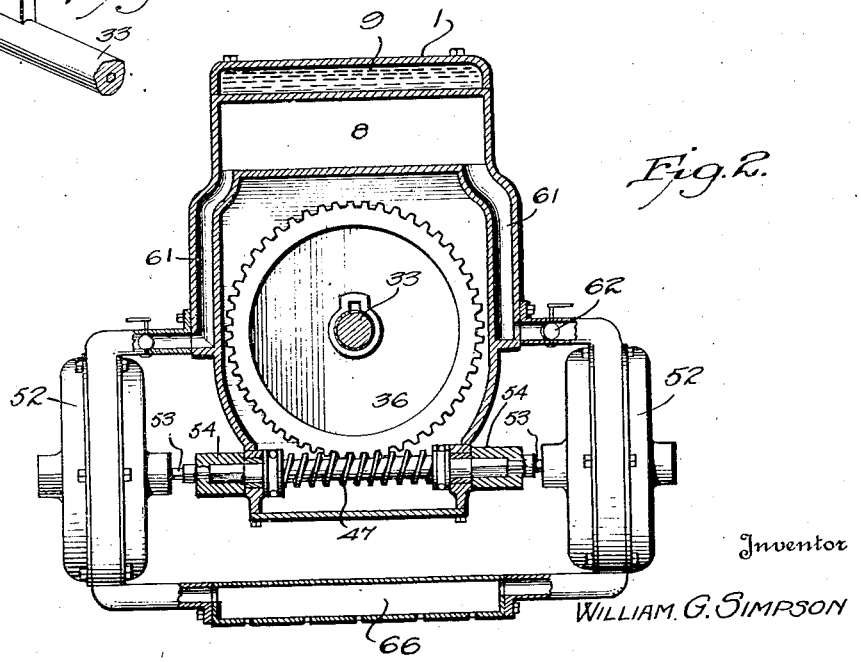
Figure 2 is a vertical sectional view on line 2—2 of Figure 1.

The equalizing chamber is provided with outlet pipes 61 connected to the top of each turbine casing, as shown in Figure 2 of the drawings, and having suitable control valves 62 arranged therein. Within the turbine casing, there is provided a chamber 64 for the reception of the gases from the feed pipes 61 and at the periphery of the turbine casing, I provide an exhaust chamber 63 from which the gases are delivered to suitable exhaust pipes 65 at the bottom of the casing, and thence to a muffler 66.

The cylinder 11 is provided with a spark plug 67 connected to a source of power (not shown) by a lead wire 68.

The operation of the device is as follows:

The engine is started by a hand crank through the provision of the gears 30 and 32 drawing a charge of gas into the cylinder 11 through the valve 22, which is opened by the cam 26. This gas is compressed and the spark plug 67 is timed to fire while the piston is held stationary by the concentric portion 18 of the cam. Immediately after the explosion of the charge, the valves 10 and 23 open, permitting the exploded gas to enter the chamber 8. The cylinder is then opened to the atmosphere by a valve (not shown) scavenging the cylinder. The piston then draws in a new charge by the opening of the inlet valve and the operation repeated. After the initial explosion, the valve 62 of the high gear turbine is opened and the key 39 arranged in the groove 44 of the worm wheel 35 to connect the turbine to the main shaft. The pressure of the gas in the chamber 8 is then employed to drive the turbine. The clutch 34 may then be connected to drive the vehicle, or other machinery. The vehicle is driven in low gear by moving the pilot 38 inwardly to place the key 40 in the groove of the gear 36 and is similarly driven in reverse gear by connecting the low gear pinion 37 to the main shaft by means of the key 41. When any one of the sets of turbines is thus connected to the engine, the corresponding valves 62 are opened and the remaining valves 62 closed. The reverse movement is obtained by cutting the slots 59 and 60 in a reverse direction, as shown in Figure 8 of the drawings, to revolve the reverse turbines in a counter-clockwise direction. The operation of the turbines will be apparent. The gas enters at the center and follows the zigzag path to the periphery, thus causing the rings and the rotor 58 to revolve. From the periphery, the gases are collected in the space 64 and conveyed to the outlet pipe 65.

It is to be understood that the form of my invention herewith shown and described is to be taken as a preferred example of the same, and that various changes in the shape, size, and arrangement of parts may be resorted to without departing from the spirit of the invention or the scope of the subjoined claim.

I claim:

In the device of the character described, a main shaft, a cylinder arranged adjacent said shaft, a piston mounted in said cylinder and operatively connected to said shaft, a plurality of gears loosely mounted on said main shaft, auxiliary shafts carrying worm wheels meshing with said gears and adapted to drive said gears, means for connecting the desired one of said gears to said main shaft, a tank adapted to receive gases from said cylinder, and turbines mounted on said auxiliary shafts, said turbines being adapted to be connected to said tank to receive gases therefrom.

WILLIAM G. SIMPSON.